United States Patent [19]

Maxim

[11] 4,347,683
[45] Sep. 7, 1982

[54] CONDUCTIVE FLUID ACTIVATED DEVICES

[76] Inventor: John Maxim, 90 Ledgebrook Ave., Norwalk, Conn. 06854

[21] Appl. No.: 183,778

[22] Filed: Sep. 3, 1980

[51] Int. Cl.³ .............................................. A63H 17/00
[52] U.S. Cl. ........................................ 46/251; 46/45; 46/232; 46/248; 200/61.05; 340/620
[58] Field of Search ................. 46/228, 232, 117, 250, 46/251, 248, 249, 230, 45; 200/61.05, 61.04; 340/620, 602, 604, 618; 73/304 R

[56] References Cited

U.S. PATENT DOCUMENTS

| 1,648,197 | 11/1927 | Roodhouse . | |
| 2,769,872 | 11/1956 | Clark . | |
| 2,832,177 | 4/1958 | Mueller . | |
| 2,852,645 | 9/1958 | Cid | 200/61.05 X |
| 3,073,162 | 1/1963 | Ulanet . | |
| 3,115,724 | 12/1963 | Clarke . | |
| 3,136,089 | 6/1964 | Gardel . | |
| 3,234,687 | 2/1966 | Elwell . | |
| 3,342,138 | 9/1967 | Parks et al. | 340/618 X |
| 3,383,795 | 5/1968 | Ryan et al. . | |
| 3,477,460 | 11/1969 | Dotto | 340/620 X |
| 3,490,170 | 1/1970 | Wolf . | |
| 3,493,951 | 2/1970 | Hartka et al. . | |
| 3,498,131 | 3/1970 | Rickey | 340/620 X |
| 3,521,791 | 7/1970 | Freise . | |
| 3,530,855 | 9/1970 | Balding | 200/61.05 X |
| 3,628,284 | 12/1971 | Soulakis . | |
| 3,755,636 | 8/1973 | Hill . | |
| 3,823,874 | 7/1974 | Kroeck | 200/61.05 X |
| 3,858,352 | 1/1975 | Cummings et al. . | |
| 3,918,199 | 11/1975 | De Masi . | |
| 3,944,966 | 3/1976 | Tillander | 200/61.05 X |
| 4,140,015 | 2/1979 | Roley | 340/620 X |

Primary Examiner—Gene Mancene
Assistant Examiner—Mickey Yu
Attorney, Agent, or Firm—Blum, Kaplan, Friedman, Silberman & Beran

[57] ABSTRACT

A conductive fluid activated device for use in toys and the like is provided. The device includes resistive responsive circuitry adapted to produce various sounds or to control electric components such as motors, solenoids and the like. A fluid retaining reservoir is adapted to receive probes which extend from and are connected to the circuitry. Various configurations of the reservoir and the probes allow the resistive responsive circuitry to respond differently depending on the configuration of the reservoir and the probes by sensing resistive changes created by the presence and motion of various fluids in or passing through the reservoir and probes.

26 Claims, 25 Drawing Figures

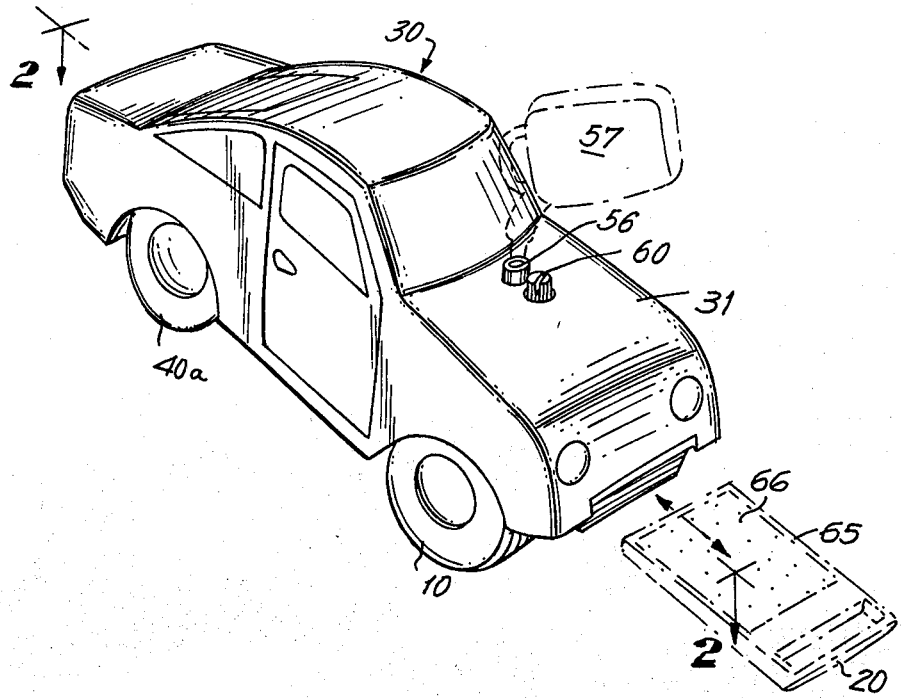
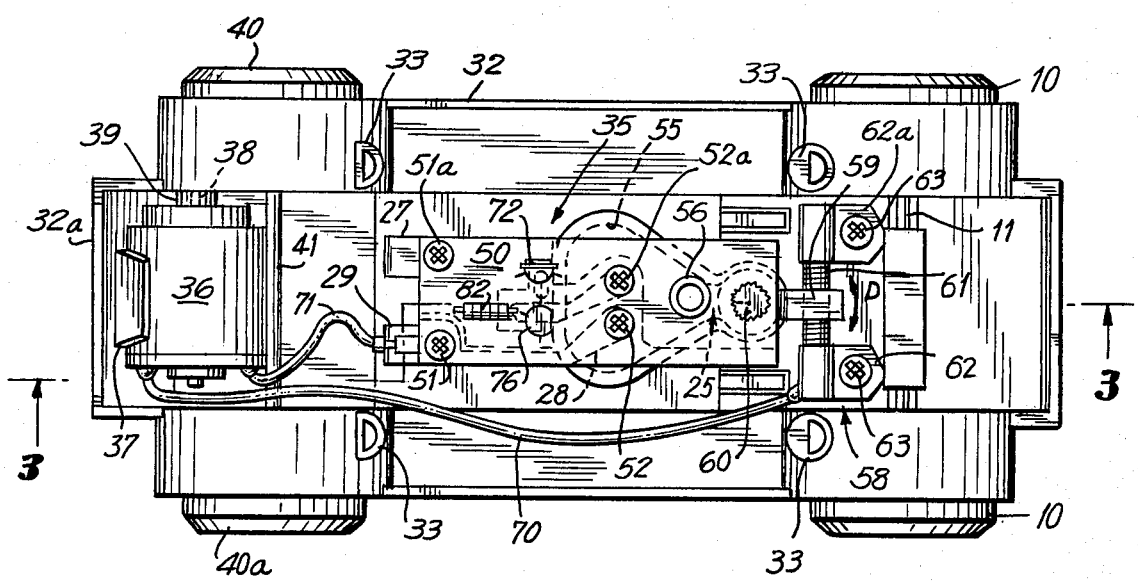

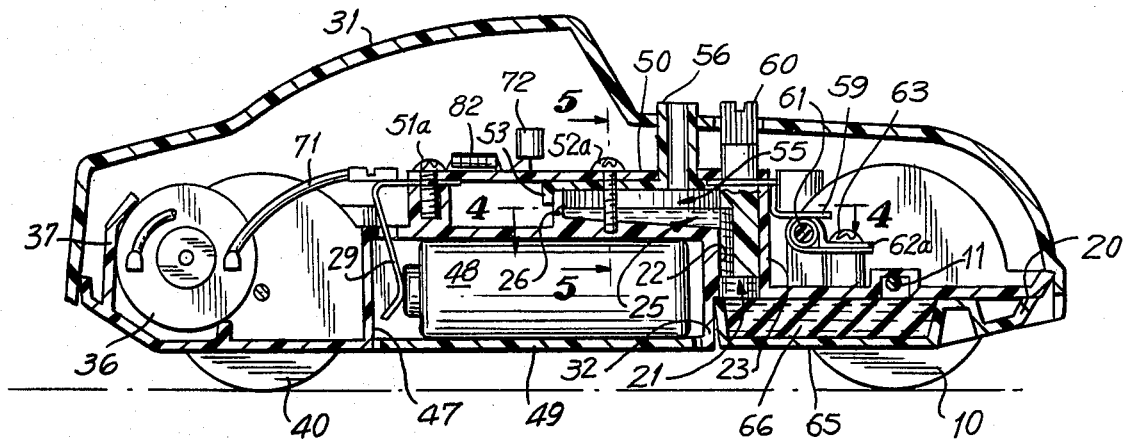
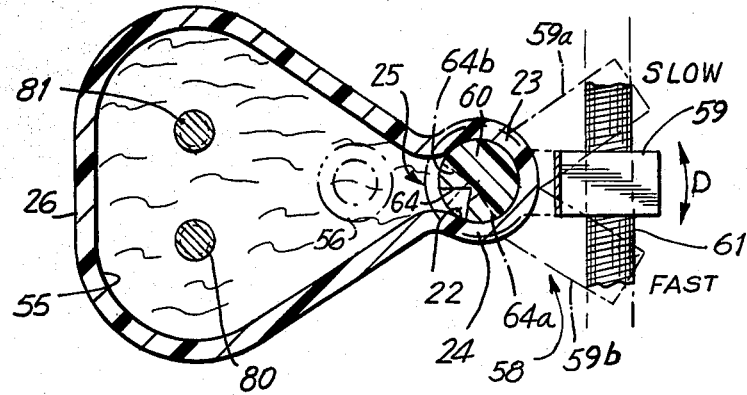
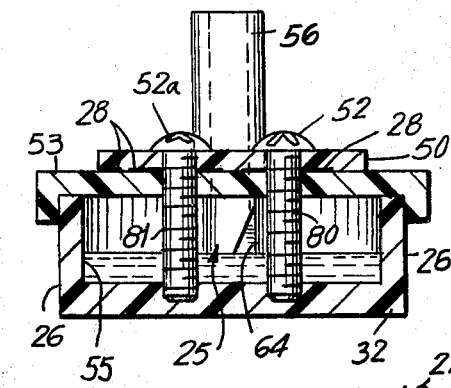
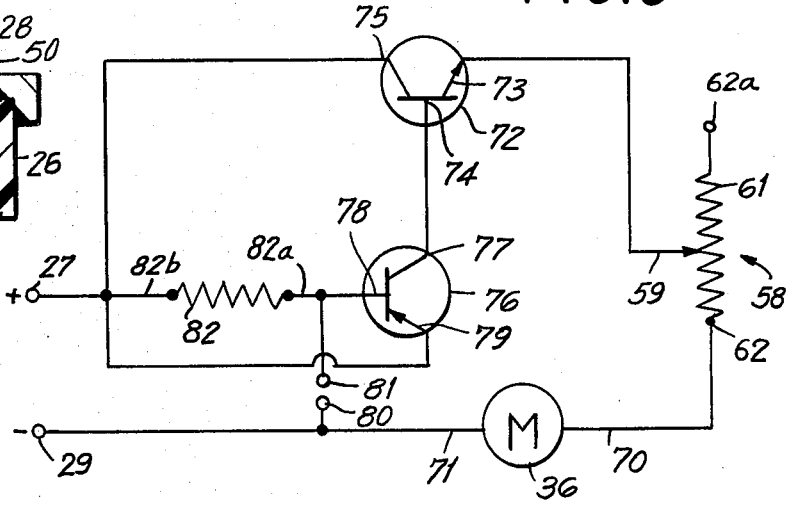

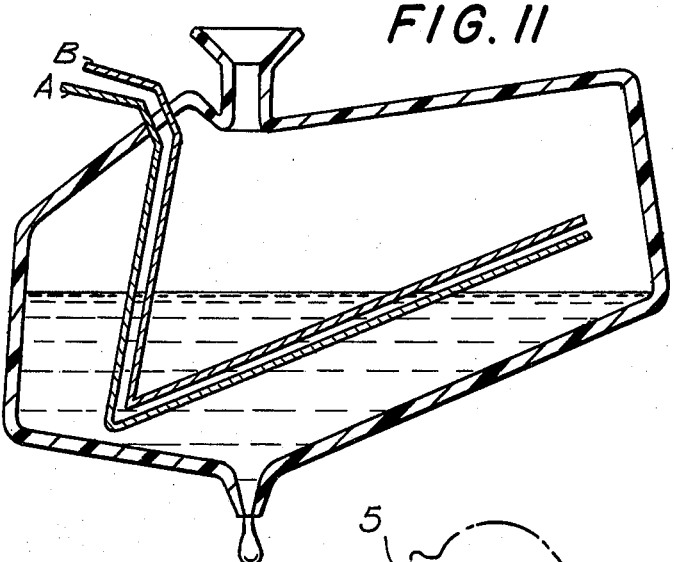
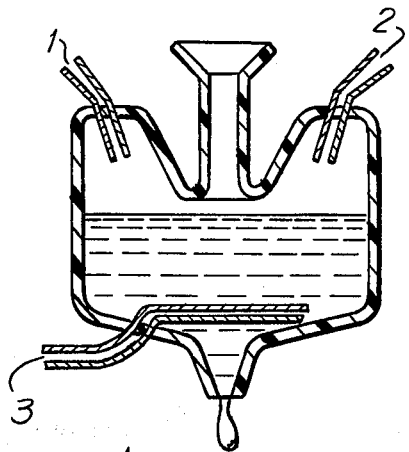
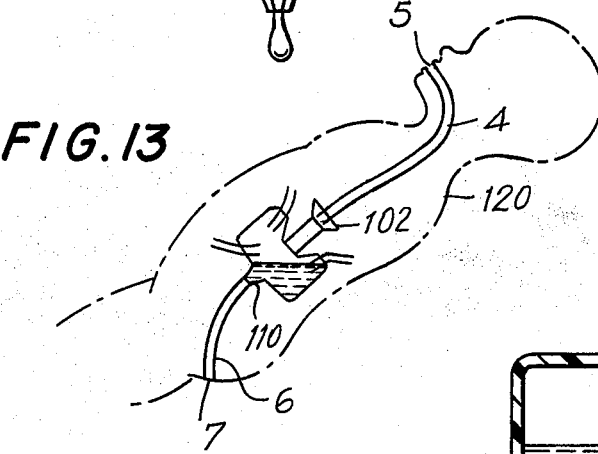
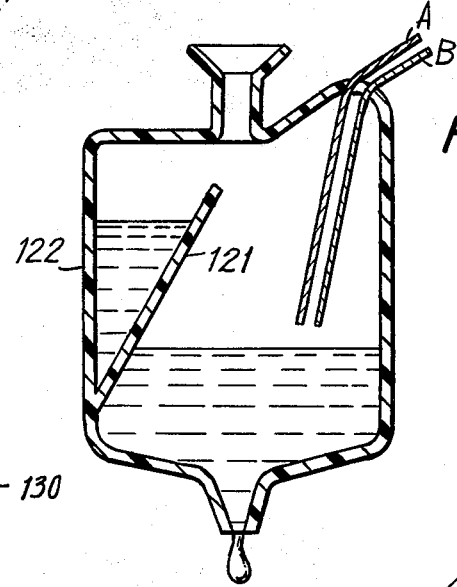
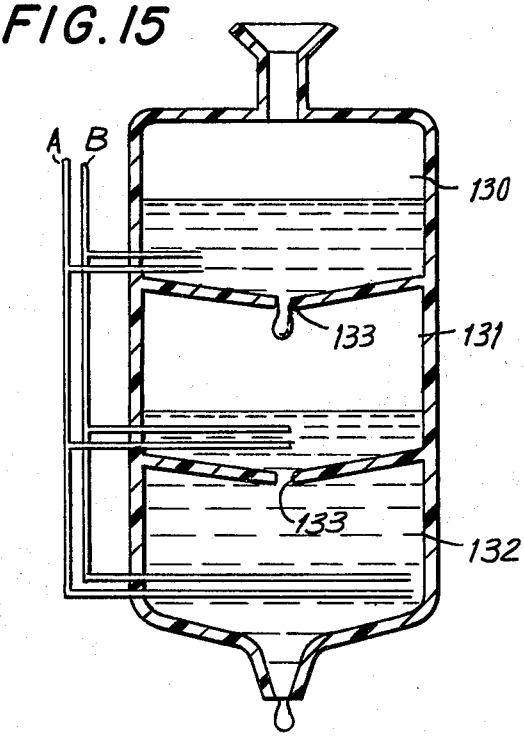
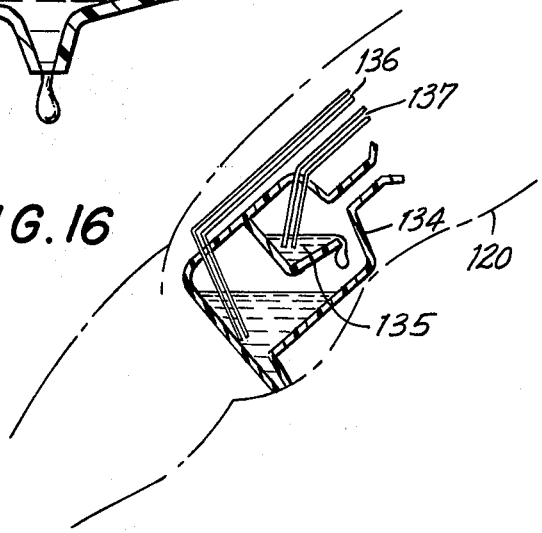

CONDUCTIVE FLUID ACTIVATED DEVICES

BACKGROUND OF THE INVENTION

This invention is directed to a conductive fluid activated device, and in particular, to a conductive fluid activated device adapted for use in toys and the like. Utilization of the conductive fluid activated device of the instant invention in toys will greatly enhance the play value thereof especially where the fluid is water. For example, a conventional battery operated toy car is generally operated manually by means of a switch or the like. However, by providing the conductive fluid activated device of the instant invention in a toy car, the play value of the car would be enhanced if the child could simulate use of gasoline by utilizing a fluid such as water. Moreover, the conductive fluid activated device of the instant invention is adapted to produce various sounds which could simulate the sound of a running car motor. Alternatively, the presence of the conductive fluid activated device of the instant invention in a toy doll would greatly enhance its play value since the doll would be able to produce various sounds such as crying and laughing upon the introduction or presence of fluid in the doll.

Accordingly, it is desired to provide an inexpensive conductive fluid activated device capable of producing various sounds and operating electrical devices such as motors and the like and readily adaptable for use in various children's toys. By providing a conductive fluid activated device which includes an inexpensive circuit and a reservoir adapted to receive various fluids, the device being adapted to react in response to the presence of fluid, the desired conductive fluid activated device is provided.

SUMMARY OF THE INVENTION

Generally speaking, in accordance with the instant invention, a device is provided including a reservoir adapted to receive a current conducting fluid or liquid. A spaced pair of electrically conductive probes extend into the reservoir and are electrically coupled to an circuit. The circuit is adapted to produce an output responsive to the configuration of the reservoir and probes in combination with the resistive qualities of the liquid. The circuit output is adapted to drive a speaker for producing various sounds or for driving electrical components such as a motor, solenoid or the like.

The conductive liquid activated device of the present invention is adapted to be powered by a simple battery. The device can be included in a toy vehicle, doll or the like invariably enhancing the play value thereof. Various configurations provide for varying responses by the circuitry.

Accordingly, it is an object of the instant invention to provide an inexpensive conductive fluid activated device fully adaptable for use in children's toys.

Another object of the instant invention is to provide a conductive fluid activated device particularly adapted to drive a motor, solenoid or the like.

A further object of the instant invention is to provide a conductive fluid activated device adapted to produce familiar and non-familiar sounds through a speaker.

A still further object of the instant invention is to provide a conductive fluid activated device which can be variously configured to produce the desired response.

Another object of the instant invention is to provide a conductive fluid activated device adaptable for use in many children's toys which will greatly enhance the play value thereof.

Other objects and advantages of the invention will in part be obvious and will in part be apparent from the specification and drawings.

The invention accordingly comprises the features of construction, combinations of elements, and arrangements of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a perspective view, partially exploded in phantom lines, of a toy car incorporating a conductive fluid activated device constructed in accordance with the instant invention, also showing a water delivery member in phantom lines;

FIG. 2 is an enlarged top plan view of the chassis of the toy car with the body removed taken along lines 2—2 of FIG. 1;

FIG. 3 is a sectional view taken along lines 3—3 of FIG. 2, with the body in position;

FIG. 4 is an enlarged sectional view taken along lines 4—4 of FIG. 3;

FIG. 5 is an enlarged sectional view taken along lines 5—5 of FIG. 3;

FIG. 6 is a schematic diagram of a first embodiment of resistive responsive circuitry constructed in accordance with a preferred embodiment of the instant invention;

FIGS. 9 through 12, 14, 15, 17 through 19, and 21 through 25 are sectional views of the various configurations of the reservoir and probes utilizable in embodiments of the fluid activated device of the instant invention;

FIG. 13 is a schematic view of the reservoir and probes of the embodiment of FIG. 12 mounted in a toy doll;

FIG. 16 is a schematic view of an alternative embodiment of a reservoir and probes mounted in the lower torso portion of a toy doll.

DESCRIPTION OF THE PREFERRED EMBODIMENTS

Figure 7:
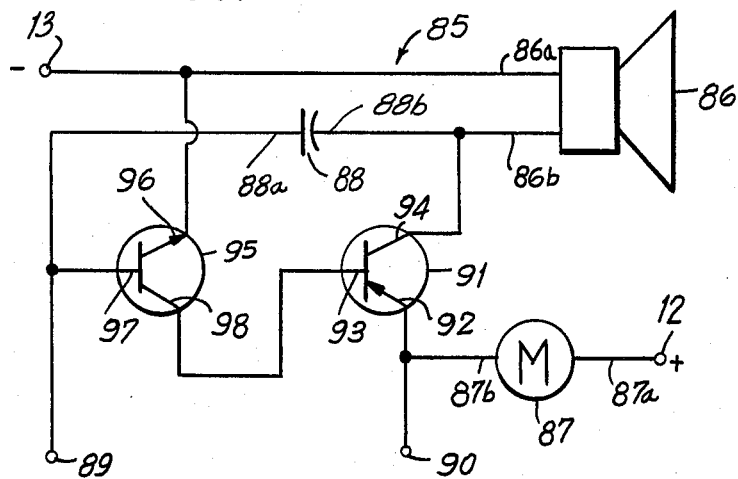
FIGS. 7 and 8 are schematic diagrams of alternative embodiments of the resistive responsive circuitry of the instant invention.

Reference is first made to FIGS. 1 through 3 wherein a toy automobile, generally indicated as 30, incorporating a conductive fluid activated device constructed in accordance with the instant invention, is depicted. The body 31 of the toy car 30 is generally formed from a molded plastic. Body 31 is secured to chassis 32 by means of four securing pegs 33. In the embodiment depicted, the body is formed of a resilient plastic which is engagable with said securing pegs but other mounting arrangements may be utilized. The conductive fluid or water activated device, generally indicated as 35, is secured to the chassis 32 in the manner described below.

Water activated device 35 includes a simple DC motor 36 secured to the rear end 32a of chassis 32 by means of a resilient molded arm 37. Mounting at this location serves to maximize friction on the driving wheel 40. The drive shaft 38 of motor 36 has a gear 39 secured thereto. Gear 39 engages a larger gear (not shown) connected to a rear wheel 40 of toy auto 30, rear wheel 40 being rotatably mounted in axle 41 supported on chassis 32. The rear wheel 40 may be provided with a friction enhancing surface if desired. Accordingly, in respose to rotation of drive shaft 38, rear wheel 40 will be caused to rotate to advance the car. Second rear wheel 40a is freely rotatably mounted on axle 41. If desired, the two rear wheels can be joined for common driver rotation. A pair of front wheels 10 are mounted for free rotation on axle 11.

A circuit board 50 is mounted in the central portion of chassis 32 by means of screws 51, 51a, 52 and 52a. A reservoir 55 is situated intermediate circuit board 50 and chassis 32. A rheostat, generally indicated as 58, includes a displaceable wiper 59 secured to a central portion of speed control member 60 for displacement in the direction of arrow D of FIGS. 2 and 4 in response to the rotation of the speed control member. The resistor portion 61 of rheostat 58, consisting of a coil of wire wrapped on a form, is mounted on chassis 32 by means of clips 62 and 62a in combination with screws 63. Resistor portion 61 of rheostat 58 is positioned so that wiper 59 is displaceable along the length of resistor portion 61, and so that wiper 59 may rest on either of clips 62 or 62a. Clip 62 must be conductive and defines a minimum resistance position. Clip 62b can define a maximum resistance position if conductive or an open switch (off) position if non-conductive or if insulated.

Referring now to FIGS. 2, 3 and 6, the components of the circuit board 50 will be described. Motor 36 is coupled by first lead 70 to clip 62 and therefore to one end of resistor portion 61 of rheostat 58. Second lead 71 is coupled between motor 36 and terminal 29 adapted for connection to the negative terminal of a DC battery 48 (FIG. 3). Additionally, second lead 71 is connected to a probe 80, defined by the body of screw 52, the purpose of which will be explained in greater detail below. The internal electrical connections on circuit board 50 are defined by a conductive pattern 28 on the underside of said circuit board. Wiper 59 of rheostat 58 is connected to the emitter 73 of NPN transistor 72. Base 74 of transistor 72 is connected to collector 77 of PNP transistor 76. Base 78 of transistor 76 is connected to a first end 82a of resistor 82. Additionally, base 78 is connected to a second probe 81 by the body of screw 52a, the purpose of which will be explained in greater detail below. The second end 82b of resistor 82 is connected to terminal 27, which is connected to the positive end of DC battery 48. Additionally, end 82b of resistor 82 is connected to collector 75 of NPN transistor 72 and additionally to emitter 79 of PNP transistor 76.

Referring now to FIG. 3, it is noted that a battery compartment 47 is defined by chassis 32, adapted to receive a battery 48, the terminals of which will contact resilient terminals 27 and 29. The battery may be a conventional 9 volt battery. A cover 49 closing said battery compartment is removably mounted to chassis 32.

Turning now to FIGS. 3 through 5 the purpose and operation of the combination reservior and probes in accordance with the invention will be discussed in detail. Reservoir 55 is defined by upstanding wall 26 formed in chassis 32 and reservoir cover 53 secured to the top of said wall. Upstanding wall 26 is essentially heart-shaped, terminating in a narrowly spaced region at the base thereof defining an exit opening 25 to said reservoir 55. Chassis 32 is also formed to define a speed control member sleeve 23 positioned adjacent to the base of heart shaped wall 26 so that exit opening 25 provides a path between the interior 22 of speed control member sleeve 23 and reservoir 55. Cover 53 is formed with an elongated spout 56 through which water can be poured into reservoir 55. Spout 56 extends through a hole in body 31 of toy auto 30 in order to provide access thereto. As depicted in FIG. 1, a simulated gas can, shown in phantom lines as 57, can be utilized to fill reservoir 55 through spout 56.

Speed control member 60 to which wiper 59 of rheostat 58 is secured, is mounted for rotation in sleeve 23 and is formed with a V-shaped slot 64 extending along the length of the lower region thereof adjacent reservoir 55. It is noted that speed control member 60 extends through a hole in body 31 proximate to spout 56 for the manual manipulation thereof. V-shaped slot 64 can provide communication between exit opening 25 of reservoir 55 and the bottom opening 21 of sleeve 23 in order to allow drainage of water from the reservoir into a removable drainage pan 65 which is also illustrated, as removed, in phantom lines in FIG. 1.

Drainage pan 65 is removably mounted in chassis 32 immediately below bottom opening 25 of sleeve 23. The removable mounting of the pan may be by laterally extending flanges (not shown) on the pan riding on slots (not shown) formed in chassis 32. Projection 20 provides a grip for effecting removal of the pan. A sponge 66 on drainage pan 65 is adapted to absorb the water which drains from reservoir 55 through V-shaped slot 64 into the drainage pan 65. As more particularly shown in FIG. 3, the floor of reservoir 55 is inclined toward exit opening 25. Further, screws 52 and 52a also serve to hold cover 53 in a closed position.

Rheostat 58 is adapted to vary the speed of motor 36. This is accomplished, as illustrated in FIG. 4, by locating wiper 59 along various positions of resistor portion 61 of rheostat 58. For example, when wiper 59 is in the position represented by reference numeral 59a in FIG. 4, the motor will be caused to rotate slowly due to the high resistance in the circuit. Additionally, when wiper 59 is in this position, V-shaped slot 64 is in the position represented by reference numeral 64a and exit opening 25 is closed. In other words, the water from reservoir 55 cannot flow through V-shaped slot 64 since V-shaped slot 64 lies completely against the wall of sleeve 24. When wiper 59 is in the position illustrated in solid lines in FIG. 4, the motor will be caused to operate at a medium speed and the V-shaped slot as illustrated in solid lines is only partially open, thereby allowing a medium flow of water therethrough. Finally, when arm 59 is in the position represented by reference numeral 59b as illustrated in FIG. 4, the V-shaped slot 64 as represented by reference numeral 64b, is totally open and the water will quickly flow therethrough into drainage pan 65.

Referring to the circuit of FIG. 6, transistors 72 and 76 are coupled to define a circuit which is turned on and off by the closing and opening, respectively, of the electrical connection between probes 80 and 81 by the presence or absence, respectfully, of water or other conducting fluid in reservoir 55. Motor 36 is driven by the output of transistor 72. Transistor 76 serves as an amplifier-switch controlling the conduction of transistor 72, and is in turn controlled by the resistance or open circuit between probes 80 and 81. Rheostat 58 further limits the current to effect speed control. As more particularly discussed below, where the water controls the resistance across probes 80 and 81, the higher the resistance value, the lower the gating current applied to base 74 of transistor 72, the slower the motor rotates. Conversely, the lower the resistance, the higher the gating current applied to base 74 of transistor 72, the faster the motor rotates.

The purpose of the combination slot 64 and rheostat 58 can be appreciated by realizing that when operating, the toy car will simulate the burning of gasoline due to the draining of water in the reservoir 55 through the V-shaped slot 64 and into the drainage pan 65. The rate of flow of water is regulated and coincides with the speed selected for the toy auto by means of adjusting the rheostat. Thus, when the car is running slow there will be little or no drainage of water from reservoir 55 just as a car which is driven slowly burns less gasoline. However, when the rheostat 58 is in wiper position 59b and the car is running at its fastest speed, the water drains quickly from reservoir 55 just as a car which is speeding burns gasoline more quickly. Note that at higher speeds, the car tends to "spin out", enhancing the play value.

Reference is now made to FIG. 7 wherein an alternative circuit, generally indicated at 85 and incorporating a speaker 86 is depicted. A first lead 87a of motor 87 is adapted to be connected to the positive terminal 12 of a battery. The other lead 87b of motor 87 is connected to both a probe 90 and the emitter 92 of PNP tansistor 91. The base 93 of PNP transistor 91 is connected to collector 98 of NPN transistor 95. Emitter 96 of NPN transistor 95 is connected both to the negative terminal 13 of the battery as well as to lead 86a of speaker 86. The base 97 of NPN transistor 95 is connected to probe 89 as well as to one end 88a of capacitor 88. Capacitor 88 provides feedback for the oscillating circuit. The other end 88b of capacitor 88 is connected to lead 86b of speaker 86 as well as to collector 94 of PNP transistor 91. This circuit is designed to operate low current devices such as motors, solenoids, and the like and/or produce non-complex sounds (tones) such as ticking, motor sounds, crying, musical notes, etc. It is noted that resistive responsive circuit 85 need not include a motor 87, thereby allowing the circuit to only produce sound. With the motor 87 removed, the positive terminal of the battery can be directly connected to probe 90 and emitter 92.

Probes 89 and 90 when contacting a body of water, or other conducting fluids, provides a resistive connection therebetween thereby activating the circuit when connected to a battery. As will be explained in detail below, by providing differently configured reservoirs and probes, different sounds and characteristics will be provided. It is noted that this circuit is designed to operate on any 3 through 9 volt battery. The motor can be adapted to drive a vehicle such as the car depicted in FIG. 1 or any other motor-driven arrangement, as desired. For example in a doll, motor 87 can actuate an eye movement or the like. Additionally, speaker 86 can be replaced with other audio transducers or other AC driven devices or the like in order to provide for different sounds and different applications.

Figure 8:
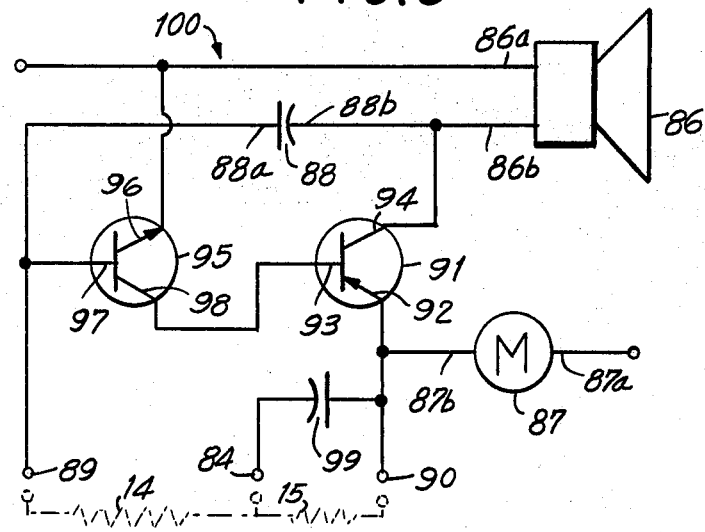

Referring now to FIG. 8 a second oscillator circuit, generally indicated as 100 is depicted. The circuit is similar to that depicted in FIG. 7 and described above except that a capacitor 99 has been introduced intermediate probe 90 and a third probe 84. This circuit is designed to operate low current devices such as motors, solenoids and the like and/or produce a wider variety of sounds.

Thus, when probes 89 and 90 are connected by water, the circuit functions in the same manner as described above. When probes 89 and 84 are connected with water, a single "chirp" is produced, a tone of a duration sufficient to charge capacitor 99. When probes 84 and 90 are connected by water, the capacitor discharges and no sound is produced. If a resistor 14, shown in phantom, is connected between probes 89 and 84, a water connection between probes 84 and 90 produces a recurring chirp. When probes 84 and 90 are exposed to a normally humid atmosphere, an infrequent "chirp" is produced as the capacitor 99 charges and discharges. If a resistor 15, shown in phantom, is connected between probes 84 and 90, a recurring "chirp" is produced when probes 89 and 84 are connected by water.

Transistors 91 and 95 in FIGS. 7 and 8 are coupled to define an oscillator. Motor 87 is driven by a half-wave rectified signal output of the oscillator. In effect, the motor is driven by the RMS current output of the oscillator so that the faster the oscillations, the faster the motor rotates, and the slower the oscillations, the slower the motor rotates. Where water controls the resistance across the probes, the higher the resistance value, the lower the frequency of oscillation, the slower the motor rotates. Conversely, the lower the resistance, the faster the oscillations, the faster the motor rotates.

The length, shape, placement and configuration of the probes within a reservoir of various configurations, provides resistive changes, dependent on the amount of water or other fluid in the reservoir, thereby causing various and intersecting sounds and responses to be produced.

Figure 9:
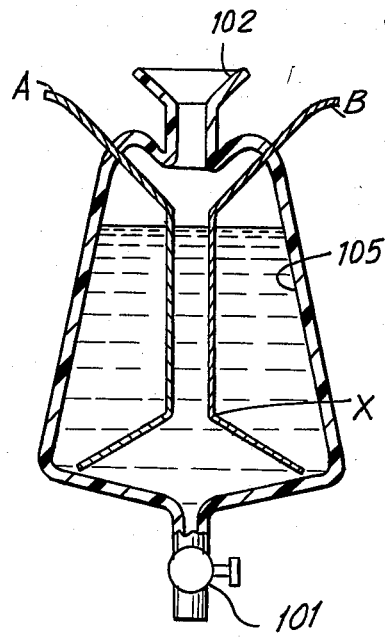

Referring to FIG. 9, a specially configured reservoir 105 and probe construction is illustrated. A closeable drain 101 is provided at the bottom of the reservoir in order to allow adjustment of the metered flow of water therethrough. A filling spout 102 is provided at the top of the reservoir in order to allow the reservoir to be filled with water. Probes A and B extend through the walls of reservoir 105 in the manner depicted and are shaped as depicted in FIG. 9, running essentially parallel along their major length but diverging near their botton ends. As the water drains from this reservoir through drain 101, the resistive characteristics of the water in combination with the probe placement causes the resistance detected by the probes to increase proportionally as the water level is reduced in the area of equally spaced probes, to provide a slowing down action for electrical components such as a motor that would simulate the running out of fuel by causing the motor to slow down. The resistance between the probes increases at a faster speed when the water level is in the region of diverging probes below point X, exaggerating the slowing down of the vehicle. The shape of this reservoir would be particularly adapted for use in the toy automobile of the type depicted in FIG. 1. However, it is noted that the reservoir described above with reference to FIGS. 1 through 6, in combination with the probes therethrough, would act only as an on/off switch. This results from the relative shortness of the probes 80, 81, rendering the frequency differences immaterial.

Figure 10:
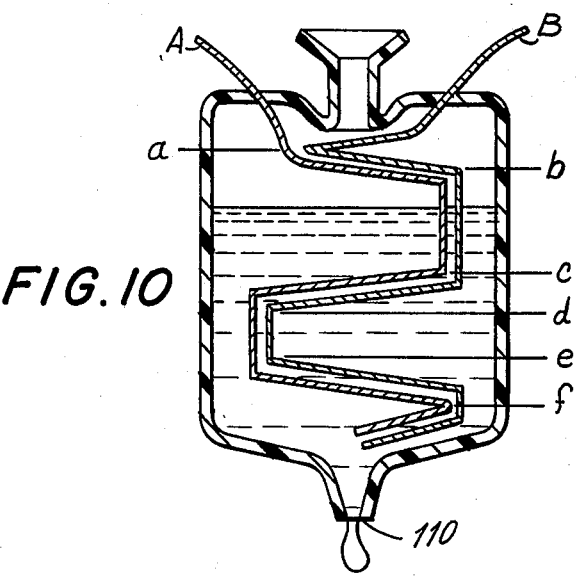

Reference is now made to FIG. 10 wherein an alternative probe and reservoir configuration is depicted. This configuration provides points at which the resistance increases more rapidly thereby exhibiting irregular slowing of motion of a motor or changes in frequency of the tone produced. As the water slowly drains through drain 110, the water level in the reservoir is descreased. As the water drains and therefore lowers itself between points a and b the resistance will change rapidly and hence the motor controlled by the circuitry will slow proportionally. However, as the water drains between points b and c, an increase in resistance will occur slowly, slowing down the motor speed gradually. Once again as the water drains between points c and d the speed will undergo a sharp decline. However, as the water drains between points d and e, the motor will once again slow down slowly. Rapid deceleration occurs in the region of e-f. By placing this configuration of reservoir and probes in the toy car depicted in FIG. 1, as the water drains out of drain 110, the car will appear to simulate down shifting as it runs out of gas (water).

Reference is now made to FIG. 11 depicting an alternative embodiment and configuration of reservoir and probes to be utilized in connection with the instant invention, wherein the orientation of the reservoir becomes relevant. As this reservoir is tilted, the resistance will decrease or increase depending on the orientation and the current flow through the circuit will change. By utilizing this configuration in a toy car, additional power is provided for the toy car to move up an incline and less power to descend, simulating gear shifting and braking.

FIG. 12 introduces the concept of multiple probe pairs 1, 2 and 3 variously placed within a reservoir to provide different characteristics depending on the orientation of the reservoir. For example, as depicted in FIG. 13, the reservoir and probe configuration depicted in FIG. 12 can be inserted into the interior portion of a toy doll 120 wherein the filling spout 102 is connected by a hollow tube 4 to the mouth 5 of the toy doll, while the drain portion 10 of the reservoir is connected similarly by a tube 6 to a lower portion 7 of the doll. Accordingly, the doll can be bottle fed with the water thereby filling the reservoir and as the reservoir drains, excretory functions will be exhibited by the doll by having the water pass into a diaper or the like (not shown). Various orientations of the doll such as lying back, sitting forward or lying down will cause the water to contact different probes thereby providing different characteristics and functions for the circuitry, for example simulated crying, murmuring or the like.

Reference is now made to FIG. 14 wherein a separate chamber 122 partially defined by wall 121 is provided to retain water therein. The use of this chamber which retains a portion of the water poured into the reservoirs allows reactivation (reconnection) of the probes by tipping the reservoir, thereby spilling the water in chamber 120 into the main reservoir. This causes the water to partially refill the reservoir thereby contacting the probes A, B, closing the circuit and causing the desired response.

Referring to FIG. 15, the use of multiple reservoirs with probes mounted in each reservoir is depicted. This configuration can be utilized to obtain decreasing different tones as the water passes between the reservoirs. This can be used to provide motion for a vehicle taking off with shifts, the speed increasing prior to running out of gas and thereafter slowing down. Note that the reservoir includes three separate chambers 130, 131 and 132, each connected by a drain hole 133 to its adjacent chamber, allowing the water poured through spout 102 to first fill reservoir 130. The water will slowly drip into chamber 131 and will activate the probes A,B therein. Further dripping into chamber 132 will activate the probes therein. It is noted that the probes are of different lengths in each chamber allowing for differing characteristics as the water contacts each pair of probes.

FIG. 16 depicts another reservoir and probe configuration inserted into the interior portion of a toy doll 120. This reservoir 134 has a separate chamber 135 similar to chamber 122 depicted in FIG. 14. However, a second set of probes 136 extends into chamber 135, while a first set of probes 137 extends into main reservoir 134, thereby providing for different characteristics, different tones or motor drive effects.

Figure 17:
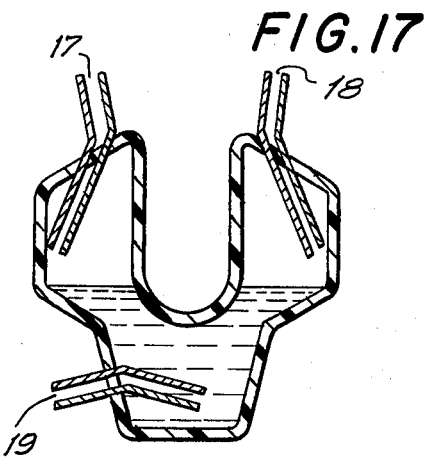

FIG. 17 illustrates a sealed reservoir with three sets of probes 17, 18 and 19 extending therein. Depending on the orientation of the reservoir different probes will contact the water thereby causing different characteristics. By keeping the water level just below the level of the probe sets 17 and 18 and shaking, interesting sounds simulating giggling will be produced.

Figure 18:
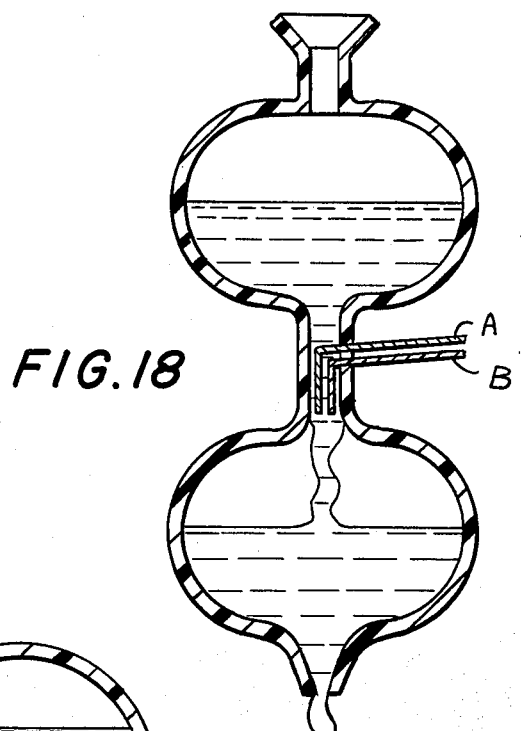

Reference is now made to FIG. 18 wherein a barbell shaped reservoir is provided. It is noted that the probes are located in the narrow portion between the two main reservoirs, thereby being activated only as water drains through the top reservoir into the bottom one.

Figure 19:
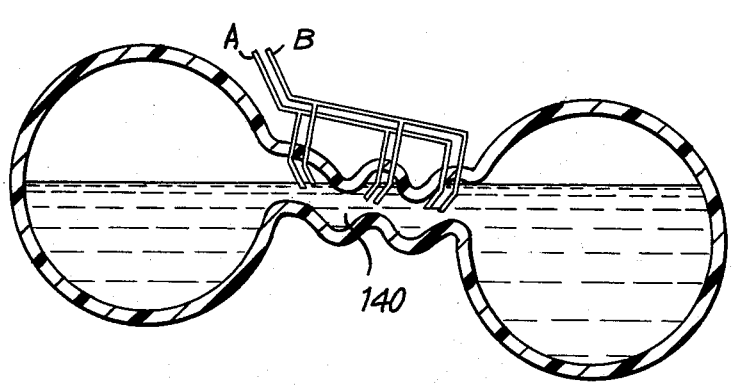

FIG. 19 depicts another sealed reservoir in the general shape of a barbell having three sets of probes introduced in the portion 140 between the two main reservoirs. Portion 140 is shaped to define a sinuous path for the water, with three sets of probes A,B therein. In utilizing this configuration, it has been found that, depending on the orientation of the reservoir, the water contacting the probes will provide for different sound combinations simulating laughing, crying, ma-ma, etc. In part, this is caused by the breaking up of the water by air bubbles which effect resistance between the probes. Such a design would be particularly suited for a toy doll or the like.

Figure 20:
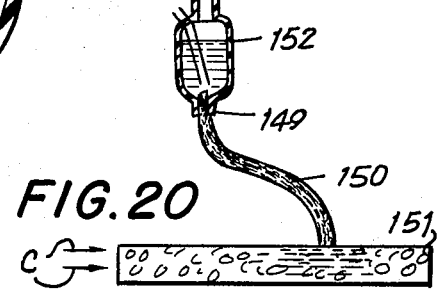
FIG. 20 is a partially sectioned view of still another embodiment of reservoir and probes mounted in conjunction with a wick and sponge utilizable in embodiments of the fluid activated device of the instant invention.

Reference is now made to FIG. 20 wherein a wick 150 is introduced into the drain 149 of the reservoir thereby promoting metered draining of the reservoir in combination with a small drain hole, in order to provide activation of the probes with a minimal amount of water. The wick 150 can be connected to an absorbent material 151 thereby providing for absorption of the water. Absorbent material 151 allows the water to drain through wick 150 into the absorbent material and to be retained in the absorbent material, such as a sponge, thereby reducing the likelihood of any spillage of liquid. If the absorbent material is mounted, by way of example, in a car so that air flows therepast in the direction of arrow C, evaporation will take place avoiding emptying the water.

Figure 21:
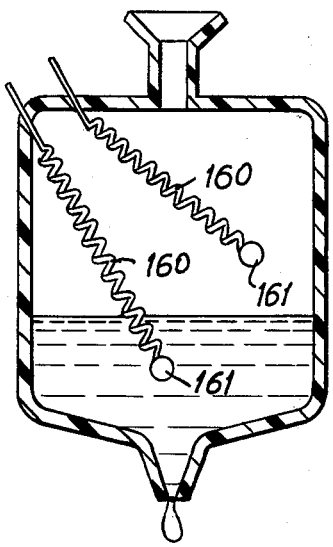

Reference is now made to FIG. 21 wherein the probe ends are spring mounted utilizing springs 160 to support probes 161, thereby providing for laughing and giggling sounds depending on the orientation of the reservoir and the length of springs 160 and probes 161 which actually contact the water.

Figure 22:
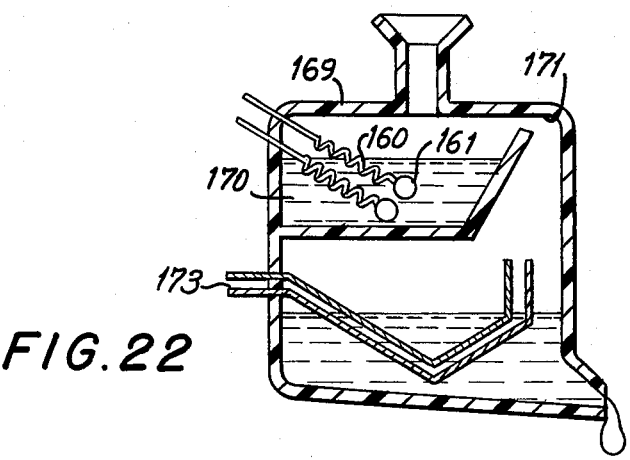

Referring now to FIG. 22, a reservoir 169 having a separate chamber 170 which will retain water when the reservoir is upright but which will allow drainage through opening 171 into the lower portion of the reservoir when the reservoir is tipped, is depicted. The upper chamber 170 has two probes 161 extending therein supported on springs 160 as depicted in FIG. 21. The lower portion of the reservoir has rigid probes extending therein. By providing this configuration, when the reservoir is upright laughing and giggling sounds can be created through the speaker. However, when the reservoir is tipped and the water drains from chamber 170 into the lower portion of the reservoir, the water contacting the probes 173 will produce a crying sound. As the water drains out through drain 172 the crying will eventually diminish to a mere murmur. Eventually all sound will cease when the reservoir is emptied. Drain 172, because of its size, meters to outward flow of the water to provide desired sounds over a period of time.

Figure 23:
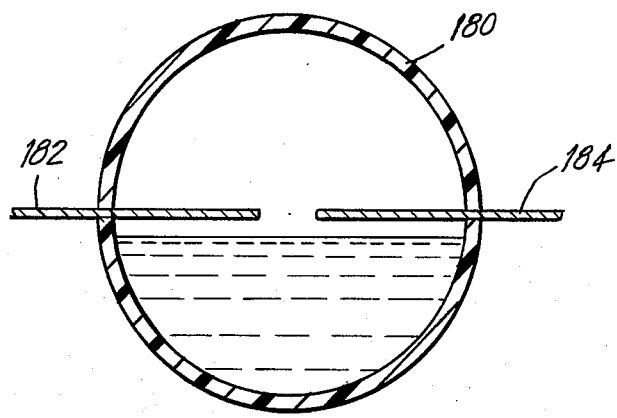
Figure 24:
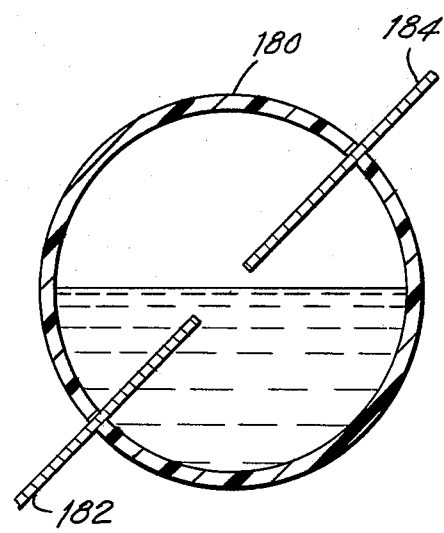
Figure 25:
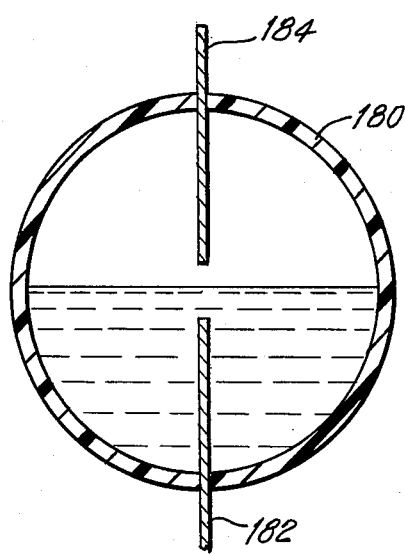

FIGS. 23, 24 and 25 depict a spherical sealed reservoir 180 partially filled with fluid. In this configuration, the probes 182, 184 are located 180° apart on opposite sides of the reservoir. As illustrated, the spherical reservoir can be rotated to different orientations to allow for varying results. The fluid volume is less than 50% of the volume of the reservoir. When the reservoir is motionless, the probes are not connected by the fluid and the circuit will remain open. However, when the spherical reservoir is in motion the fluid will flow within the reservoir and will randomly connect the two probes thereby closing the circuit. The sensitivity of the spherical reservoir and probe configuration is controlled by adjusting the volume of fluid in the reservoir to accomodate various intensities of motion or vibration. The gap between the probes can be altered. An enlarged gap will allow the the sensing of vigorous motion of the reservoir. A reduced gap allows the configuration to sense lighter motion.

As noted above the various reservoir, probe and circuit configurations will provide a multiplicity of results and can be utilized in connection with various toys. For example, the probes, instead of being round, can be plates having a larger surface area for producing different responses. The conductive fluid activated device of the instant invention contains few parts and is inexpensive to manufacture. The device can be utilized in a plurality of applications and will greatly enhance the play value of any toy wherein it is placed. Various combinations of the depicted configurations can be provided which will result in interesting and fascinating results. Conductive liquids or fluids other than water can be used.

It will thus been seen that the objects set forth above and those made apparent from the proceeding description, are efficiently attained and, since certain changes may be made in the constructions without departing from the spirit and scope of the invention, it is intended that matter contained in the above description and shown in the accompanying drawings shall be interpreted as illustrative and not in a limiting sense.

It is also to be understood that the following claims are intended to cover all of the generic and specific features herein described and all statements of the scope of the invention, which as a matter of language, might be said to fall therebetween.

What is claimed is:

1. A device comprising toy vehicle chassis means; wheel means rotatably mounted on said chassis means; motor means mounted on said chassis means and operatively coupled to said wheel means for driving same; reservoir means carried on said chassis means capable of receiving a current conducting liquid; a pair of electrically conductive probe means in spaced relation in said reservoir means; and circuit means coupled to said probe means and adapted to be actuated when said pair of probe means are electrically coupled by said liquid, said circuit means having an output coupled to said motor means for driving said motor means, whereby a toy vehicle actuated by said liquid for driving same is produced.

2. A device comprising toy vehicle frame means; driven means carried by said toy vehicle frame means; motor means mounted on said toy vehicle frame means and operatively coupled to said driven means for driving same; reservoir means carried on said toy vehicle frame means capable of receiving a current conducting liquid; at least a pair of electrically conductive probe means in spaced relation in said reservoir means; and circuit means coupled to said probe means and adapted to be actuated when said pair of probe means are electrically coupled by said liquid, the amount of said liquid in said reservoir means determining the resistance between said pair of probe means, said circuit means having an output coupled to said motor means for driving said motor means, said output being related to the resistance between said pair of probe means, whereby a device actuated by said liquid is produced.

3. A device as claimed in claim 1 or 2, further comprising speed control means coupled to said circuit means for the selective control of the output of said circuit means whereby the speed of said motor means is controlled.

4. The device as claimed in claim 2, wherein said reservoir means includes outlet means for the selective passage of said liquid therethrough.

5. A device as recited in claims 2, or 1, wherein said reservoir means is formed with an exit opening for the passage of said liquid therethrough; and including metering means coupled to said reservoir means exit opening for the selective control of the rate of flow of said liquid from said reservoir means.

6. A device as recited in claims 2 or 1, wherein said current conductive liquid is water.

7. A device as recited in claims 2 or 1, wherein said circuit means is adapted to produce an output responsive to the resistance between said pair of probe means, said probe means being shaped and positioned so that different resistances are defined therebetween for different orientations of said liquid relative to said probe means.

8. A device as recited in claim 7, including means for resiliently supporting said probe means, whereby the resistance between said probe means varies with the displacement thereof relative to said liquid.

9. A device as recited in claim 7 wherein said circuit means output is at least a part of an oscillating signal, the frequency of oscillation of said signal varying with changes in resistance between said probe means.

10. A device as recited in claims 2 or 1, wherein said reservoir means is shaped to permit the selective positioning of the liquid relative to the probe means, said circuit means being representative of the relative position of said liquid and probe means.

11. A device as recited in claim 10, including at least two pairs of probe means at different locations in said reservoir means.

12. A device as recited in claim 11, wherein said circuit means is adapted to produce different outputs in response to said liquid closing the circuit between said respective pairs of probe means.

13. A device as recited in claim 11, wherein said reservoir means includes at least two compartments and a liquid passage therebetween, at least one of said pairs of probe means being positioned in each said compartment.

14. A device as recited in claim 11, wherein said reservoir means includes at least two compartments and a sinuous liquid passage therebetween, at least two of said pairs of probe means being positioned at spaced locations in said sinuous passage.

15. A device as recited in claims 2 or 1, wherein said reservoir means is formed with an exit opening, and including wick means leading from said exit opening for metering the flow of liquid from the reservoir.

16. A device as recited in claim 15 and including absorbent means for receiving liquid from said wick means.

17. A device as recited in claim 16 and including means for positioning said absorbing means for evaporation of said liquid therefrom.

18. A device as recited in claims 2 or 1, wherein said reservoir means is formed with an exit opening and including absorbing means for receiving liquid from said exit opening and storing same.

19. A device as recited in claim 1 or 2, wherein said circuit means is an oscillator, the frequency of the output of said circuit means being responsive to the resistance between said pair of probe means as determined by the relative orientation of said liquid and probe means and the shape of said probe means, the speed of said motor means being responsive to the frequency of said circuit means output.

20. A device as recited in claim 1 or 2, said motor means being a d.c. motor, said circuit means being adapted to produce a half wave rectified signal at the output thereof for driving said motor means.

21. A device as recited in claims 2 or 1, wherein said circuit means is adapted to produce an output responsive to the resistance between said pair of probe means, said reservoir means being formed with an exit opening, said probe means being formed from elongated conductors extending at least over a portion of their length in the path of the top level of said liquid in said reservoir toward said exit opening.

22. A device as recited in claim 21, wherein the spacing between said pair of probe means varies along said path of said top level of said liquid in said reservoir, whereby the resistance between said probe means varies as the top level of liquid in said reservoir lowers toward said exit opening.

23. A device as recited in claim 21, wherein said spaced pair of elongated probe means includes at least a portion extending in a direction including a component directed laterally of said path of the top level of said liquid, whereby the rate of change of resistance between said probe means is dependent on the extent of said lateral component.

24. A device as recited in claim 23, wherein the ends of said pair of probe means in said reservoir means include biasing means whereby the resistance between said probe means further varies due to the displacement of said biasing means through said liquid.

25. A device as recited in claim 21, wherein said pair of probe means is elongated, said probe means being variously angled along the lengthwise extent thereof.

26. A device as claimed in claim 21, further comprising metering means coupled to said reservoir means exit opening for the selective control of the rate of flow of said liquid from said reservoir means.

* * * * *